United States Patent
Inaba et al.

[19]

[11] Patent Number: 6,054,075
[45] Date of Patent: Apr. 25, 2000

[54] INSERT MOLDING METHOD AND APPARATUS THEREFOR

[75] Inventors: Yoshiharu Inaba, Kawasaki; Susumu Ito; Mitsushi Yoshioka, both of Oshino-mura, all of Japan

[73] Assignee: Fanuc Ltd., Yamanashi, Japan

[21] Appl. No.: 08/913,963

[22] PCT Filed: Jan. 29, 1997

[86] PCT No.: PCT/JP97/00203

§ 371 Date: Sep. 25, 1997

§ 102(e) Date: Sep. 25, 1997

[87] PCT Pub. No.: WO97/27985

PCT Pub. Date: Aug. 7, 1997

[30] Foreign Application Priority Data

Jan. 29, 1996 [JP] Japan .................................. 8-033175

[51] Int. Cl.[7] .................................................. B29C 45/14
[52] U.S. Cl. ..................... 264/40.1; 264/279.1; 264/334; 425/139; 425/150; 425/165
[58] Field of Search ................. 264/40.1, 279.1, 264/334; 425/155, 163, 165, 169, 171, 139, 150

[56] References Cited

U.S. PATENT DOCUMENTS

| 2,163,814 | 6/1939 | Swarovski | 264/275 |
|---|---|---|---|
| 4,465,424 | 8/1984 | Inaba et al. | 414/589 |

FOREIGN PATENT DOCUMENTS

| 57-189810 | 11/1982 | Japan . |
|---|---|---|
| 62-70012 | 3/1987 | Japan . |
| 63-125318 | 5/1988 | Japan . |
| 1-104313 | 7/1989 | Japan . |
| 3-34811 | 2/1991 | Japan . |
| 4-296520 | 10/1992 | Japan . |
| 6-53119 | 7/1994 | Japan . |
| 6-328502 | 11/1994 | Japan . |

*Primary Examiner*—Angela Ortiz
*Attorney, Agent, or Firm*—Staas & Halsey, LLP

[57] ABSTRACT

An insert molding method and apparatus not requiring a multiple movable molds and permitting stable insert molding to be performed by means of light, small-sized equipment. A robot for removing a molded product and a robot for placing an insert member are arranged around a mold clamping mechanism, and making them perform removal of a molded product and placement of the insert member, respectively, during a mold opening process of a molding cycle. The molding apparatus does not requirs a plurality of lower molds (stationary molds) and accordingly permits to eliminate a turntable or a sliding table, whereby the molding apparatus can be reduced in size and weight. Further, since only one lower mold suffices to obtain one type of molded products, the manufacturing cost of molds can be reduced and the mold temperature control can be made easier, so that not only the molding conditions are stabilized but also the life of the mold can be prolonged by eliminating the poor positioning.

8 Claims, 3 Drawing Sheets

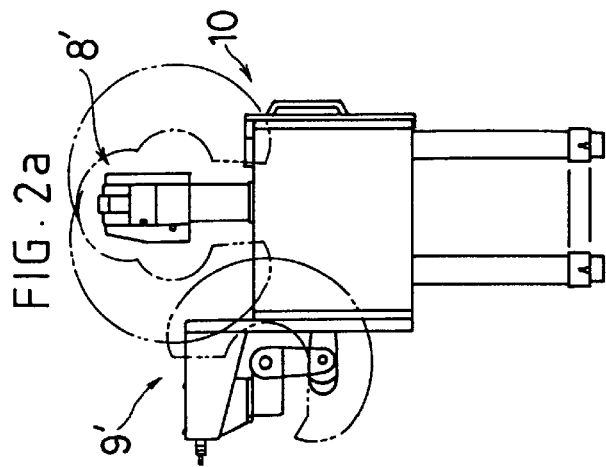
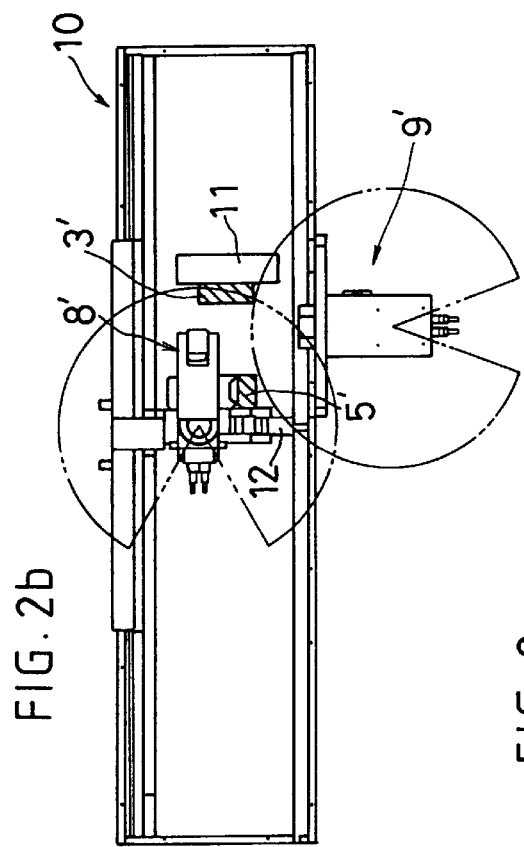
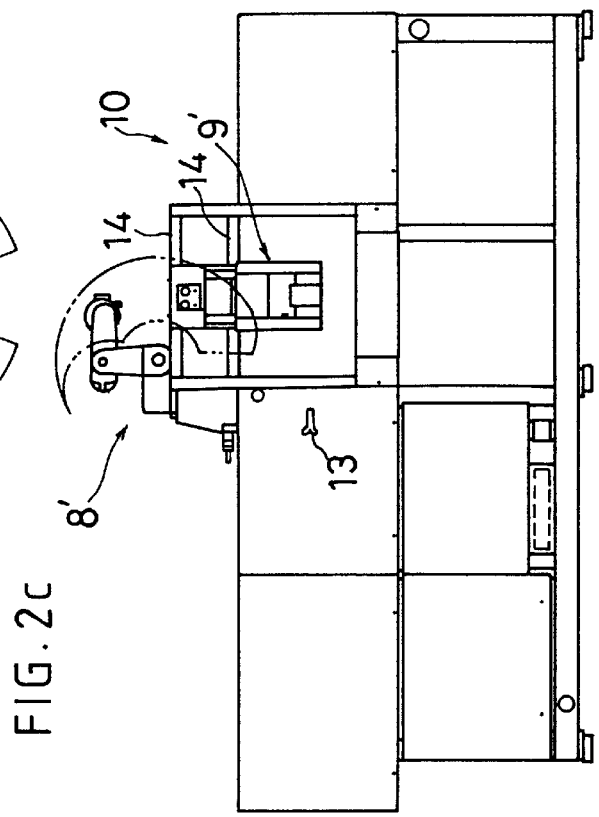

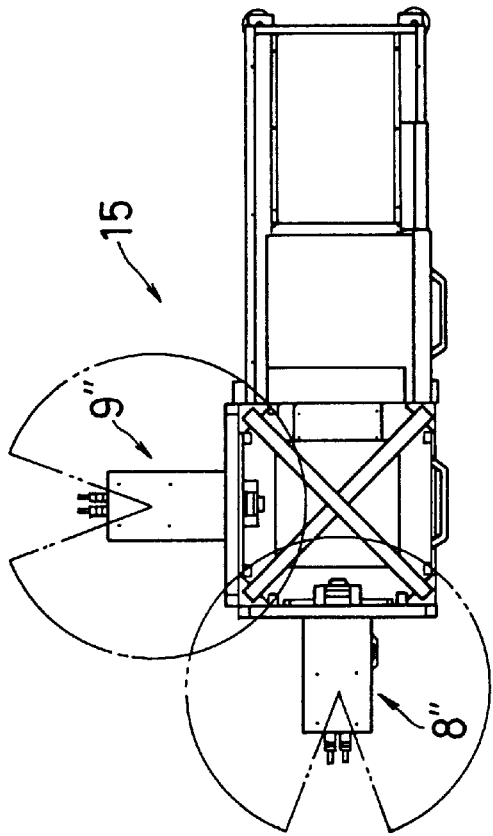
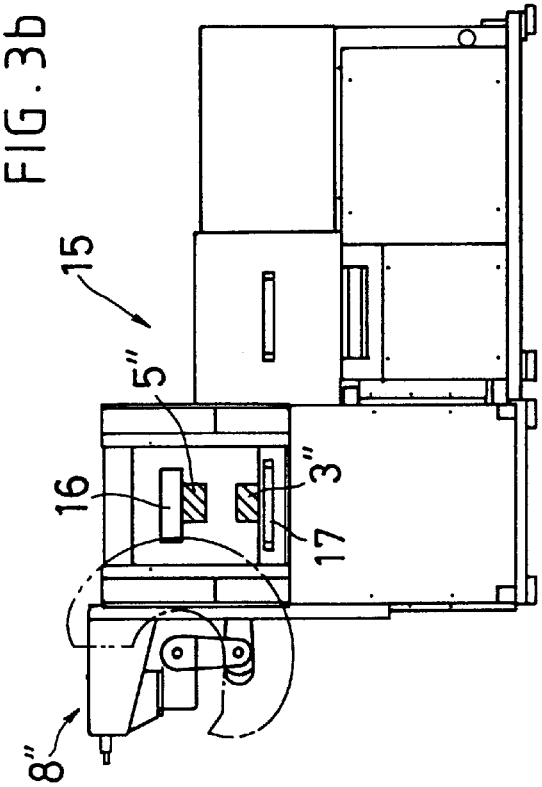
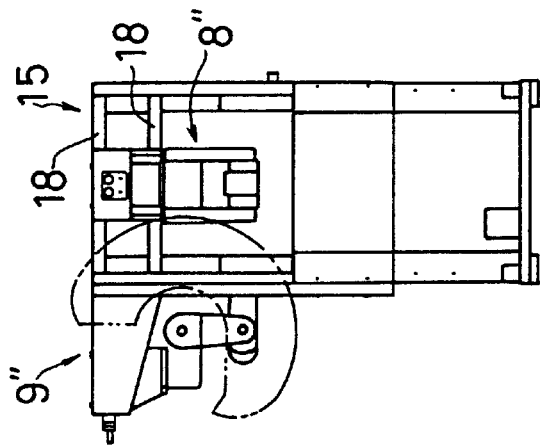

INSERT MOLDING METHOD AND APPARATUS THEREFOR

TECHNICAL FIELD

The present invention relates to a method of and an apparatus for obtaining a resin molded product containing a different material by previously placing an insert member such as metal one in a cavity of a mold and by filling the cavity with resin.

BACKGROUND ART

Insert molding process has a problem that the process would be complex compared with an ordinary molding process using resin alone, since an insert member needs to be placed in a cavity of a mold prior to filling with resin. To solve the problem and to automate the molding process, several insert molding methods have already been proposed.

The most typical one is an insert molding method using a rotary turntable. In this insert molding method, one stationary mold and two to four movable molds are used to obtain a single type of molded product. In the method, a stationary mold is mounted on a main body of the molding machine while the remaining two to four movable molds are placed on the rotary turntable. While the turntable is rotated, placement of an insert member, confirmation of the placement, filling of resin and molding to shape, and ejection of a molded product will take place in order. Even if the operation process for molding is simplified to the greatest possible extent, the turntable must be provided with at least a stage for placing an insert member and removing a molded product, and a stage for molding the product into shape by filling resin. Thus, at least two movable molds and the turntable for placing these molds thereon are needed to obtain a single type of molded products.

Consequently, in the case of the insert molding method using the rotary turntable, the weight of the overall equipment becomes large and the turntable increases in overall machine size, thereby giving rise to a problem that the location for installation is largely limited. Also, since two or more movable molds are needed to obtain a single type of molded products, the manufacturing cost of the molds is high, causing a high unit cost of products. Further, it is difficult to control the temperature of two or more movable molds to exactly an equal level, causing a problem of dispersion of product quality due to the difference in operating conditions of the movable molds, even when the same products are molded continuously.

In addition, since a plurality of movable molds are placed on the turntable and are positioned relative to the stationary mold, each time the table is rotated, the positional relationship between the movable and stationary molds cannot always be aligned perfectly. In some cases, the stationary and movable molds are scratched by being dragged against each other or slightly displaced from each other, possibly adversely affecting the accuracy of products or shortening the lives of the molds.

An insert molding method using a linear sliding table, instead of the rotary turntable, has also been proposed but it differs from the above-described method only in that a plurality of movable molds make rectilinear movements and not circular movements. With this method, the installation space for the molding machine can be saved to some degree, however the aforementioned problems associated with the insert molding method using the rotary turntable still exist.

DISCLOSURE OF THE INVENTION

An object of the present invention is to provide an insert molding method and an apparatus therefor, which do not require numerous movable molds but are capable of performing stable insert molding operation with light and small-sized equipments without damaging the molds.

An insert molding method according to the present invention comprises the steps of: mounting a single stationary mold and a single movable mold on a clamping mechanism; arranging a first robot for removing a molded product and a second robot for placing an insert member around the clamping mechanism; and drivingly controlling the first and second robots during a mold opening process of a molding cycle to make the first and second robots remove the molded product from the mold and place the insert member in the cavity of the mold, respectively. The present invention also provides an insert molding apparatus for carrying out the above insert molding operation. The insert molding method according to the present invention can be applied to a vertical injection molding machine, a horizontal injection molding machine, and a parting-type injection molding machine in which resin is filled in the cavity from a sprue formed on a parting line of the stationary and movable molds.

BRIEF DESCRIPTION OF THE DRAWINGS

FIGS. 2a to 2c illustrate an embodiment of a horizontal injection molding machine for carrying out the insert molding method of the invention, FIGS. 2a, 2b, and 2c being a side view, a plan view and a front view, respectively, of the horizontal injection molding machine; and FIGS. 3a to 3c illustrate a parting-type injection molding machine for carrying out the insert molding method of the invention, FIGS. 3a, 3b, and 3c being a plan view, a front view and a side view, respectively, of the parting-type injection molding machine.

BEST MODE OF CARRYING OUT THE INVENTION

Figure 1A:
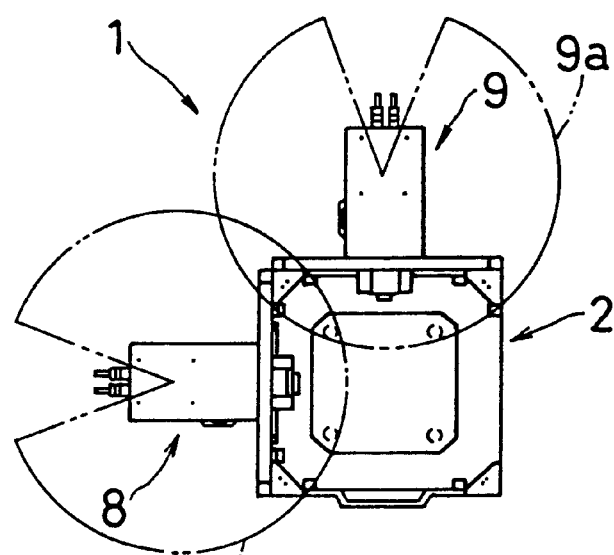
FIGS. 1a to 1c illustrate an embodiment of a vertical injection molding machine for carrying out the insert molding method of the invention, FIGS. 1a, 1b, and 1c being a plan view, a side view and a front view, respectively, of the vertical injection molding machine.
Figure 1B:
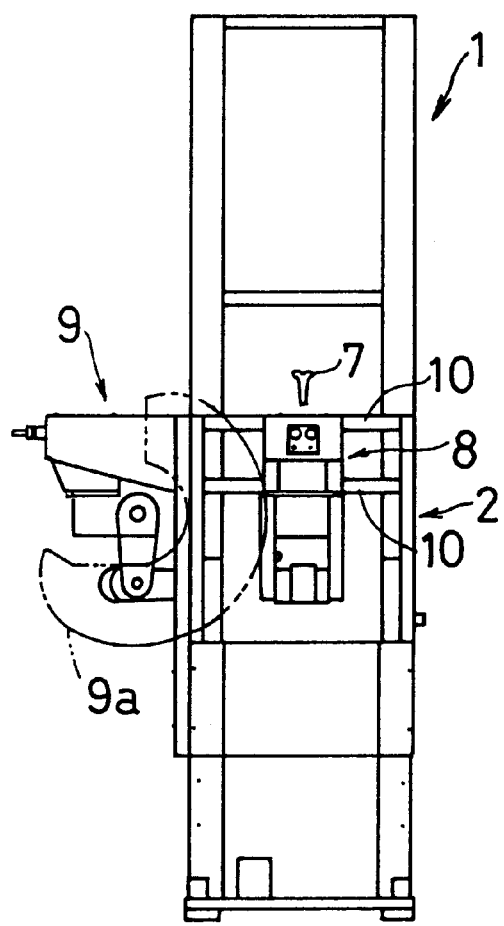
Figure 1C:
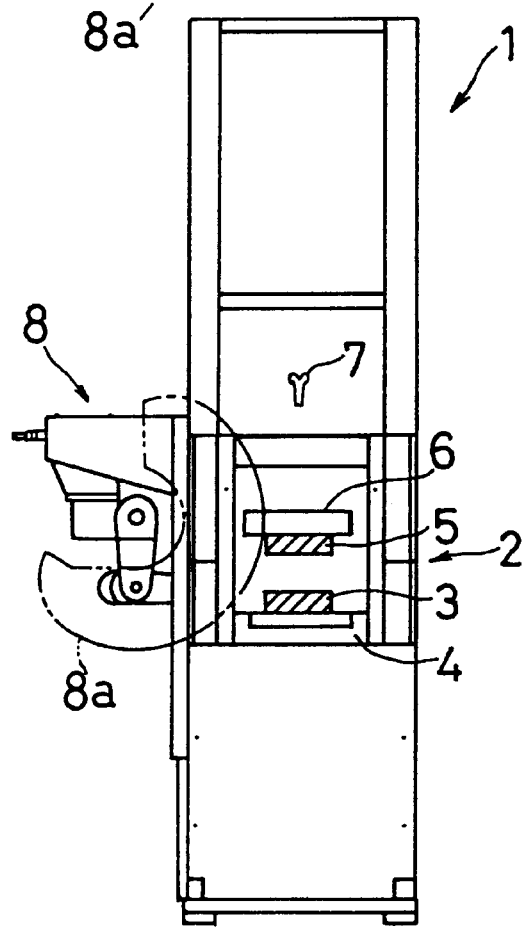

A molding machine 1 shown in FIG. 1 is a vertical injection molding machine having a mold clamping mechanism 2 with an upper movable mold and a lower stationary mold. As shown in FIG. 1c, a lower mold 3 (stationary mold) constituting a part of a mold set is fixed on a stationary platen 4 of the vertical injection molding machine 1, and an upper mold 5 (movable mold) constituting the other part of the mold set is fixed on a movable platen 6 of the vertical injection molding machine 1. In FIGS. 1b and 1c, a mark 7 indicates the position of a nozzle at the distal end of an injection cylinder. As seen by the mark 7, FIGS. 1a to 1c illustrate a sprue break state of the injection cylinder, but during injection and pressure holding processes, a nozzle touch state is of course maintained so that a tip of the nozzle is held in contact with the sprue of the upper mold 5.

Conventionally, when performing insert molding operation by this type of vertical injection molding machine 1, one upper mold 5 as well as two to four lower molds 3 with the same shape are provided, with a turntable rotatably supported at its axis on the stationary platen 4, and the two to four lower molds 3 are mounted on the turntable. While the turntable is rotated, operations such as placing an insert member in the cavity of the lower mold 3, confirmation of the placement, filling of resin, and removing a molded product have to be performed.

More particularly, in each of the molding cycles, only one of the lower molds 3 is actually fitted with the upper mold 5 and filled with resin, whereas for the remaining three lower molds 3 (in the case of a four-stage type), the placement of an insert member, confirmation of the placement of the insert member, and removal of the molded product are respectively performed.

More specifically, the four lower molds 3 are arranged on the turntable at an angular pitch of 90° along the circumference. The positions in which the individual lower mold parts 3 are located are referred to as stages 1, 2, 3 and 4, respectively. Then, an insert member is placed in the cavity of the empty lower mold 3 at the stage 1 by means of a robot or the like. In the subsequent molding cycle, the turntable is rotated by 90° and the lower mold 3 at the stage 1 is fed to the stage 2, where the placement of the insert member is confirmed by means of an optical sensor or the like. Then, when the turntable is rotated further by 90° in the subsequent molding cycle, the lower mold 3 at the stage 2 proceeds to the stage 3, where the lower mold 3 and the upper mold 5 are fitted together and filled with resin, whereby insert molding is actually performed. Finally, in the succeeding molding cycle, the turntable is further rotated by 90°, so that the lower mold 3 which has resin filled therein at the preceding stage (stage 3) and in which a molded product remains is fed to the stage 4, where a mold release operation is performed to remove the molded product.

When the turntable is rotated further by 90° in the subsequent molding cycle, the lower mold 3 at the stage 4 proceeds to the stage 1 (returns to the origin position), and operations similar to the above are repeatedly executed thereafter.

Consequently, after the 90° rotation in each molding cycle, the lower mold 3 then located at the stage 1 is empty to await the placement of an insert member, the lower mold 3 located at the stage 2 and with an insert member placed therein awaits confirmation of the placement of the insert member, the lower mold 3 located at the stage 3 after undergoing the insert member placement process and the insert member placement confirmation process is in a standby state for the filling of resin therein, and the lower mold 3 located at the stage 4 and having undergone insert molding is in a standby state for the removal of the molded product. Thus, each of the molding cycles, that is, every 90° rotation of the turntable, yields one molded product (or one shot molding).

However, a molding operation using such complex equipment entails a significant increase in the weight of the entire apparatus, and also, since the use of the table leads to an increase in the overall machine size, the location for installation of the molding machine is greatly limited, as mentioned above. Further, since four lower molds 3 are required (in the case of the four-stage type) with respect to one upper mold 5 in order to obtain a single type of molded products, the manufacturing cost of molds becomes high, giving rise to a problem that the unit cost of products increases.

If the confirmation of the placement of an insert member by means of an optical sensor or the like is omitted, and the removal of a molded product and the placement of an insert member are performed in the same stage (in the above example, the stage 1), the stages eventually needed on the turntable are the aforementioned stages 1 and 3, that is, the stage 1 for removing a molded product and placing an insert member and the stage 3 for actually carrying out molding operation. Nevertheless, two lower molds 3 are required with respect to one upper mold 5 in order to obtain one type of molded products, and this is not sufficient to solve the problems such as the increase in the weight of the molding machine, limitations on the location for installation of the molding machine, increases in the manufacturing cost of molds, and increases in the unit cost of products. On the other hand, the insert molding method using a sliding table in place of the turntable is no more than that the two to four stages are arranged on the sliding table, and still cannot be free from the same problems as those with the insert molding method using the turntable, such as increase in weight of the molding machine and increase in the manufacturing cost of molds. In both of the methods, since a plurality of lower molds 3 are needed, it is difficult to control the temperatures of the individual lower molds 3 exactly to uniform molding temperature, and thus the quality of molded products is liable to vary due to different conditions of the lower molds 3, even when the products are molded continuously.

In view of the foregoing, this embodiment relinquishes the mechanism comprising a plurality of stages or a plurality of lower molds 3 arranged on the turntable or the sliding table and employs instead the vertical injection molding machine 1 in which a single upper mold 5 and a single lower mold 3 are mounted on the movable and stationary platens 6 and 4, respectively. Further, a robot 8 for removing molded products and a robot 9 for placing an insert member are arranged around the mold clamping mechanism 2 (see FIGS. 1a to 1c), and the operations of these robots 8 and 9 are controlled during a mold opening process of a molding cycle to carry out removal of a molded product and placement of an insert member.

Therefore, the stages for removing a molded product and for placing an insert member, which are indispensable to the conventional techniques to accomplish insert molding, become unnecessary, thereby making unnecessary the turntable or sliding table for providing a plurality of stages and a second or more lower molds 3 to be arranged in the respective stages.

Both the molded product removing robot 8 and the insert member placing robot 9 of this embodiment are articulated handling robots, and are mounted on the left side surface and rear surface of the vertical injection molding machine 1, respectively, via respective stays 10 as shown in FIGS. 1a to 1c. The end effectors at the distal ends of these two robots can be moved to any desired position within respective working areas 8a and 9a indicated by the two-dot-chain lines in the figures. That is, the molded product removing robot 8 is capable of removing a molded product from the lower mold 3 and dropping it on a product pallet or a product transport belt conveyor or the like arranged in the vicinity of the vertical injection molding machine 1. On the other hand, the insert member placing robot 9 is capable of picking up an insert member from an insert member storage pallet arranged in the vicinity of the vertical injection molding machine 1 and placing the insert member in the cavity of the lower mold 3.

The end effectors of the molded product removing robot 8 and the insert member placing robot 9 may be one of a clamping type, a suction type, etc., and in the case where the insert member has magnetic properties, an end effector of magnetic type can be used for the insert member placing robot 9. Further, in the case where a number of pins or the like are to be arranged side by side in the cavity as the insert members, a special-purpose loading device may be attached to the insert member placing robot 9, instead of the end effector.

The operation sequence of the molded product removing robot 8 and the insert member placing robot 9 are outlined in the following.

When a mold opening completion signal is inputted to a robot control device while the upper and lower molds 5 and 3 are open after completion of the injection molding operation of one molding cycle, a predetermined molded product removal program is started, whereupon the molded product removing robot 8 starts to operate, causing the end effector of the robot 8 to be moved from a retracted position to a molded product removing position within a plane of projection of the mold, and a molded product, which remains in the lower mold 3, is removed from the mold by clamping or attracting by suction by the end effector. Then, the end effector is moved to a molded product receiving position of the product pallet or product transport belt conveyor, etc., and the molded product is released from the clamped or attracted state, whereby it is transferred to the product pallet or product transport belt conveyor, etc. Subsequently, the end effector is again returned to the retracted position. Needless to say, the molded product receiving position and the retracted position of the end effector may be set at the same position.

Then, after the return of the molded product removing robot 8 to the retracted position is confirmed, an insert member placement program is started, whereupon the insert member placing robot 9 starts to operate, causing the end effector of the robot 9 to be moved to an insert member loading position within the plane of projection of the mold, and the insert member previously clamped or attracted by suction by the end effector is placed in the lower mold 3. Then, the end effector is once returned to its retracted position, and is moved to the insert member storage pallet arranged nearby, to clamp or attract by suction an insert member for the next insert member loading operation. Like the aforementioned case, the retracted position of the end effector of the insert member placing robot 9 may be coincident with the position of the insert member storage pallet.

In the case where a dedicated loading device equipped with a magazine or the like for storing insert members is used in place of the end effector of the insert member placing robot 9, no stationary-type insert member storage pallet is required, so that the insert member placing robot 9 merely reciprocates between the retracted position and the insert member loading position in the plane of projection of the mold.

When the insert member placing robot 9 has returned to its retracted position, a mold closing start command is inputted to the control device of the vertical injection molding machine 1, causing injection molding operation of the subsequent molding cycle beginning with mold closing to be started. The control device for the molded product removing robot 8 and the insert member placing robot 9 need not necessarily be provided independent of the control device of the vertical injection molding machine 1, and the operations of the molded product removing robot 8 and the insert member placing robot 9 may be controlled by a single control device primarily provided for the vertical injection molding machine 1, as long as the processing unit has sufficient throughput and also the memory has a sufficient storage capacity.

Further, as mentioned previously, it is not essential that the operation of the insert member placing robot 9 be started after completing the operation of the molded product removing robot 8. The two robots are preferred to be operated simultaneously as long as the positions of the end effectors of the robots will not interfere with each other, since the molding cycle time can be shortened in this way.

For example, the following procedure may be adopted. When the upper and lower molds 5 and 3 are opened apart after completion of the injection molding operation of one molding cycle, the end effector (or the insert member loading device) of the insert member placing robot 9 is moved to a standby position within the plane of projection of the mold in parallel with movement of the end effector of the molded product removing robot 8 to the molded product removing position in the plane of projection of the mold, and after completion of the molded product releasing operation by the molded product removing robot 8 is confirmed by an optical sensor or the like, the insert member placing robot 9 is immediately moved from the aforementioned standby position to the insert member loading position. With this procedure, the molding cycle time can be shortened by a time period equal to the sum of the time necessary for the molded product removing robot 8 to move from the molded product removing position to its retracted position and the time necessary for the insert member placing robot 9 to move from its retracted position to the insert member loading position. The standby position mentioned herein means a position where the end effector (or the insert member loading device) of the insert member placing robot 9 will not interfere with the end effector of the molded product removing robot 8 or its molded product removing operation, and is also a position closest to the end effector of the molded product removing robot 8.

Instead of controlling the operations of the molded product removing robot 8 and the insert member placing robot 9 by the control device of the vertical injection molding machine 1, a control device may be provided for each of the robots 8 and 9 so that the vertical injection molding machine 1 and the robots 8 and 9 can operate cooperatively through exchange of electric signals among the individual control devices. Also, in place of the two robots 8 and 9, a double-arm robot (robot equipped with two arms) may be used. Further, the operations of the robots 8 and 9 may be controlled by a single robot control device. In the case where a robot equipped with two end effectors capable of performing different tasks independently (specifically, removal of a molded product and placement of an insert member) is employed, the robot may be of a single body.

Although FIG. 1 illustrates the case where the molded product removing robot 8 and the insert member placing robot 9 are mounted on the left side surface and rear surface of the vertical injection molding machine 1 respectively, the locations of the robots 8 and 9 may be reversed. Moreover, there are no particular restrictions on the mounting positions of the robots 8 and 9 as long as the robots can perform their required tasks.

FIG. 2 illustrates another embodiment in which the method of the present invention is applied to a horizontal injection molding machine 10 known in the art. As shown in FIG. 2b, a movable mold 3' constituting a part of a mold set is fixed on a movable platen 11 of the horizontal injection molding machine 10, and a stationary mold 5' constituting the other part of the mold set is fixed on a stationary platen 12 of the horizontal injection molding machine 10. A mark 13 in FIG. 2c indicates the position of a nozzle at the distal end of an injection cylinder. FIGS. 2a to 2c illustrate a sprue break state of the injection cylinder, as seen by the mark 13, but during injection and pressure holding processes, a nozzle touch state is of course maintained with the nozzle tip held in contact with the sprue of the stationary mold 5'.

A molded product-removing robot 8' and an insert member placing robot 9' of this embodiment are articulated handling robots, like those already explained with reference to FIG. 1, and are mounted on the upper surface and rear surface of the horizontal injection molding machine 10 respectively through respective stays 14, as shown in FIGS. 2a to 2c. End effector sections at the distal end portions of these robots can be moved to any desired position within respective working areas indicated by the two-dot-chain lines in the figures.

The requirements relating construction of the end effector, operation control and mounting positions of the individual robots 8' and 9' are identical with those already explained regarding the robots 8 and 9.

In this embodiment, the robots 8' and 9' are controlled while the mold is open so that the removal of a molded product and the placement of an insert member can be carried out either sequentially or parallelly. Therefore, as in the above-described embodiment, the stages for removing a molded product and placing an insert member can be eliminated, and insert molding can be performed with ease by an ordinary horizontal injection molding machine 10 without using the turntable or sliding table requiring a plurality of movable molds 3' to be mounted thereon. Furthermore, this embodiment is free of the problems such as an increase in the weight of the molding machine, increase in the manufacturing cost of molds, etc., and also the problem associated with the temperature control of movable molds. Especially, in horizontal injection molding machines 10, an increase in a load applied to tie bars frequently causes collision, wear or dragging of the molds and resultant molding defect, so that reduction of the machine weight provides a remarkable advantage.

FIG. 2 illustrates the horizontal injection molding machine 10 which is equipped with both the molded product removing robot 8' and the insert member placing robot 9'. In many horizontal injection molding machines 10, however, the molded product releasing operation can be carried out by merely actuating the ejector pin of the movable mold 3' by an ejector rod of the movable platen 11 of the molding machine body, and in such a case, it is not essential to use the molded product-removing robot 8'. However, the ejector rod and the ejector pin can be substituted for the molded product removing robot 8' only when the product to be removed can withstand an impact resulting from being dropped from the mold.

FIG. 3 illustrates the case where the present invention is applied to a parting-type injection molding machine 15.

In the parting-type injection molding machine, a mold opens in the vertical direction as in the vertical injection molding machine 1 shown in FIG. 1, while the injection cylinder is arranged to extend in the horizontal direction as in the horizontal injection molding machine 10 shown in FIG. 2, and the nozzle of the injection cylinder is abutted horizontally against a sprue which is defined by grooves cut in outer peripheral portions of respective parting faces of an upper mold 5" attached to a stationary platen 16, and a lower mold 3" attached to a movable platen 17, to fill resin in the mold. This type of injection molding machine is advantageous in that the tie bars are less deflected by the load of the mold because the mold is opened in the vertical direction, and also that the overall length of the molding machine can be shortened as compared with the horizontal injection molding machine 10 because the tie bars are arranged to extend vertically, whereby the space occupied by the molding machine can be reduced.

As shown in FIG. 3b, the lower mold 3" constituting a part of the mold set is fixed on the movable platen 17 of the parting-type injection molding machine 15, and the upper mold 5" constituting the other part of the mold set is fixed on the stationary platen 16 of the parting-type injection molding machine 15.

Both a molded product removing robot 8" and an insert member placing robot 9" of this embodiment are articulated handling robots, like those already explained with reference to FIGS. 1 and 2, and are mounted on the left side surface and rear surface of the parting-type injection molding machine 15, respectively, through respective stays 18, as shown in FIGS. 3a to 3c. End effectors at the distal end portions of these robots can be moved to any desired position within respective working areas indicated by the two-dot-chain lines in the figures.

The requirements relating to the construction of the end effector applicable to the individual robots 8" and 9", the operation control, mounting positions, etc. of the robots 8" and 9" are identical with those already explained regarding the robots 8 and 9 or the robots 8' and 9'.

In this embodiment, the operations of robots 8" and 9" are controlled while the mold is open, so that the removal of a molded product and the placement of an insert member can be carried out either sequentially or parallelly. Therefore, as in the above-described two embodiments, the stages for removing a molded product and placing an insert member can be eliminated, and insert molding can be performed with ease by the parting-type injection molding machine 15 without using the turntable or sliding table that requires a plurality of lower molds 3" to be placed thereon. Further, this embodiment is free of the problems such as an increase in the weight of the molding machine, increase in the manufacturing cost of molds, the temperature control of movable molds.

According to the present invention, neither the rotary turntable nor the linear sliding table needs to be mounted on the molding machine for carrying out an insert molding, and moreover, an insert molding can be accomplished using only a single movable mold prepared with respect to one stationary mold. Accordingly, the insert molding can be performed easily, without entailing an increase in the size or weight of the molding machine body or an increase in the manufacturing cost due to the need to produce additional molds.

Further, the method of the present invention permits a direct use of the conventional injection molding machines commercially manufactured and sold, such as conventional vertical and horizontal injection molding machines. Therefore, when starting the insert molding on a new business line, the initial investment can be cut down.

Also, since insert molding can be carried out using only a pair of single movable molds, the temperature of the molds can easily be maintained constant, so that molding defects caused by variations in the mold temperature can be reduced, compared with a case of conventional insert molding operation using a plurality of movable molds.

Furthermore, unlike the conventional insert molding in which a plurality of movable molds are placed on the turntable or sliding table and each movable mold is positioned relative to the stationary mold each time the table is rotated or moved, the positional relationship between the movable and stationary molds can always be made constant, and therefore, dragging of the molds can be prevented, thus not only prolonging the life of the mold but also preventing adverse effects on products (flaw, defective mold release, etc.) caused by damage to the molds.

What is claimed is:

1. An insert molding method for obtaining a resin molded product containing a different material by placing an insert member in a cavity of a mold and filling the cavity with resin, using a molding apparatus having a clamping mechanism for clamping the mold, said insert molding method comprising the steps of:

(a) mounting a single stationary mold and a single movable mold on said clamping mechanism;
(b) arranging a first robot for removing the molded product and a second robot for placing the insert member around said clamping mechanism; and
(c) drivingly controlling said first and second robots during a mold opening process of a molding cycle to make the first and second robots remove the molded product from said mold and place the insert member in the cavity of said mold, respectively.

2. An insert molding method according to claim 1, wherein said molding apparatus comprises a vertical injection molding machine.

3. An insert molding method according to claim 1, wherein said molding apparatus comprises a horizontal injection molding machine.

4. An insert molding method according to claim 1, wherein said molding apparatus comprises a injection molding machine in which resin is filled in the cavity from a sprue formed on a parting line of the stationary and movable molds.

5. An insert molding apparatus for obtaining a resin molded product containing a different material by placing an insert member in a cavity of a mold and filling the cavity with resin, using a molding apparatus having a clamping mechanism for clamping the mold, said apparatus comprising:

a single stationary mold and a single movable mold mounted on the clamping mechanism;

a first robot arranged around said clamping mechanism, for removing the molded product from said mold during a mold opening process of a molding cycle; and a second robot arranged around said clamping mechanism, for placing the insert member in the cavity of said mold during the mold opening process of the molding cycle.

6. An insert molding apparatus according to claim 5, wherein said molding apparatus comprises a vertical injection molding machine.

7. An insert molding apparatus according to claim 5, wherein said molding apparatus comprises a horizontal injection molding machine.

8. An insert molding apparatus according to claim 5, wherein said molding apparatus comprises a injection molding machine in which resin is filled in the cavity from a sprue formed on a parting line of the stationary and movable molds.

* * * * *